Feb. 21, 1928.

W. L. SCHULTZ 1,659,964

BEVEL EDGING MACHINE

Filed May 4, 1923

INVENTOR
W. L. SCHULTZ
BY
Harry W. Styll
ATTORNEY

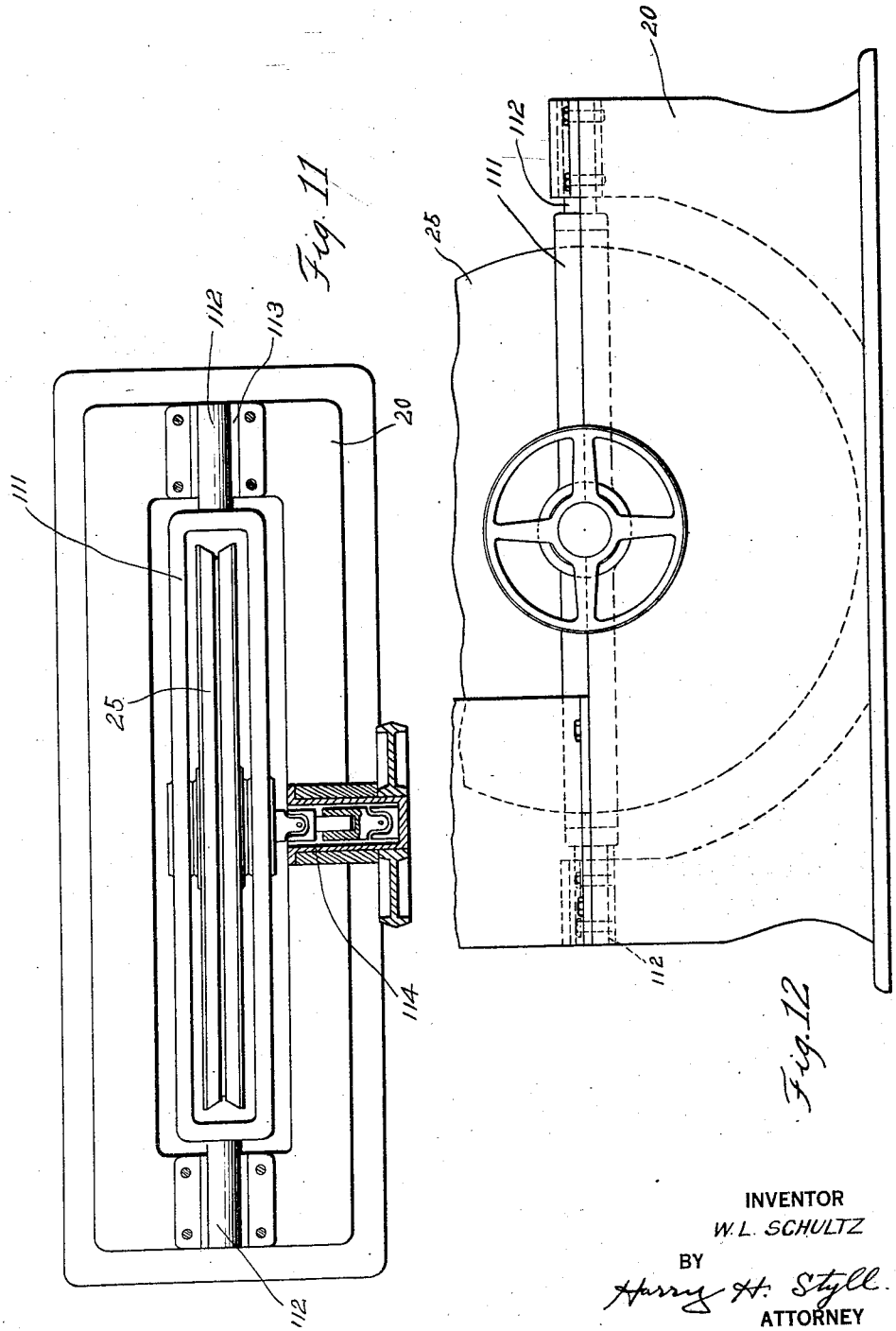

Feb. 21, 1928.

W. L. SCHULTZ 1,659,964

BEVEL EDGING MACHINE

Filed May 4, 1923     7 Sheets-Sheet 7

INVENTOR
W. L. SCHULTZ
BY
Harry H. Styll
ATTORNEY

Patented Feb. 21, 1928.

1,659,964

UNITED STATES PATENT OFFICE.

WILLIAM L. SCHULTZ, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BEVEL-EDGING MACHINE.

Application filed May 4, 1923. Serial No. 636,665.

This invention relates to improvements in grinding machines, and has particular reference to machines for grinding bevel edges on lenses.

The important objects of the invention are to provide a machine with a rotatable grinding element having two angularly disposed surfaces on its periphery, said surfaces tapering inwardly to form a V-shaped groove; to provide such a machine wherein the lens to be ground is supported and held against the stone in such a way that its edge is bevelled on both sides at the same time; to support the lens holders on a pivoted carriage; to arrange the parts so as to provide relative lateral movement between the lens and the stone; to provide such lateral movement by mounting the abrasive wheel on a shaft which will be capable of longitudinal movement; to provide such a machine wherein both bevels will be equally and uniformly ground upon the lens edge; to provide means for gradually feeding the lens against the stone; to provide means for limiting the size to which the lens will be ground; to provide means for removing the lens out of engagement with the grinding element when the limit has been reached; to provide means for holding the lens carriage in disengaged position when changing the lenses.

Other objects and advantages will be apparent during the course of the following description taken in connection with the accompanying drawings.

In the drawings, wherein similar reference characters designate corresponding parts throughout the several views:

Figure 11 is a top plan view of another modification, parts being in section.

Figure 12 is a fragmentary side elevation of the machine shown in Figure 11.

Figure 5:
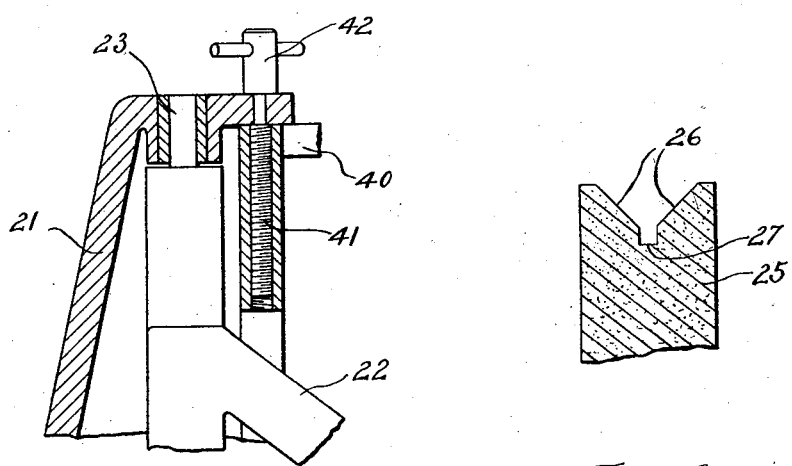
Figure 5 is a fragmentary sectional view showing a method of supporting the wheel carrying frame.
Figure 6:
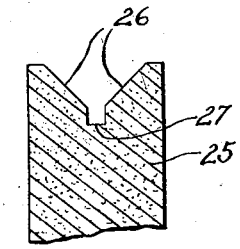
Figure 6 is a fragmentary sectional view through the edge of the abrasive wheel.

Referring particularly to Figures 1 to 8 inclusive, the reference character 20 designates the base of the machine, which may be of any desirable shape and construction, and preferably has a vertical extension 21 at the rear side thereof. Pivoted in the base 20 and the extension 21 is a frame 22, which is mounted in bearings 23, said frame carrying a shaft 24 upon which is mounted the abrasive wheel 25. As best shown in Figure 6, the abrasive wheel is provided on its periphery with two angularly disposed surfaces 26 forming a V-shaped groove, at the bottom of which is a kerf 27 for a purpose to be hereinafter explained.

Extending from one side of the base 20 is a bearing member 28, in which is journaled a sleeve 29 carrying the pulley 30. Also secured to the sleeve 29 is a universal joint 31 which forms a telescoping connection 32 with a second universal joint 33 secured to the shaft 24. A shaft 34 carries the pulley 35 upon one end, which is connected to the pulley 30 by the belt 36; at the other end of the shaft 34 is a pulley 37, which may be driven by the belt 38 from any suitable source of power.

I have herein described the drive mechanism for the abrasive wheel 25 as including belts, pulleys and universal joints, but it will, of course, be obvious that other driving mechanisms may be used, such as gearing, chains, etc.

Figure 1:
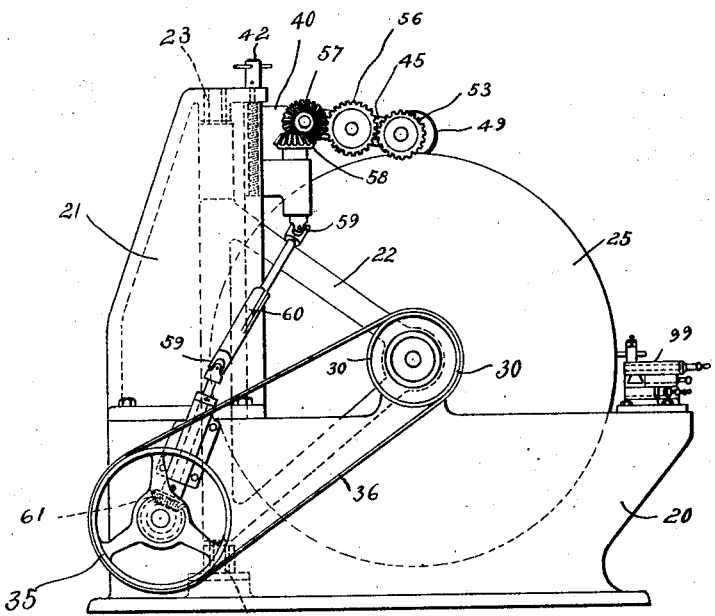
Figure 1 is a side elevation of a machine embodying the invention.
Figure 2:
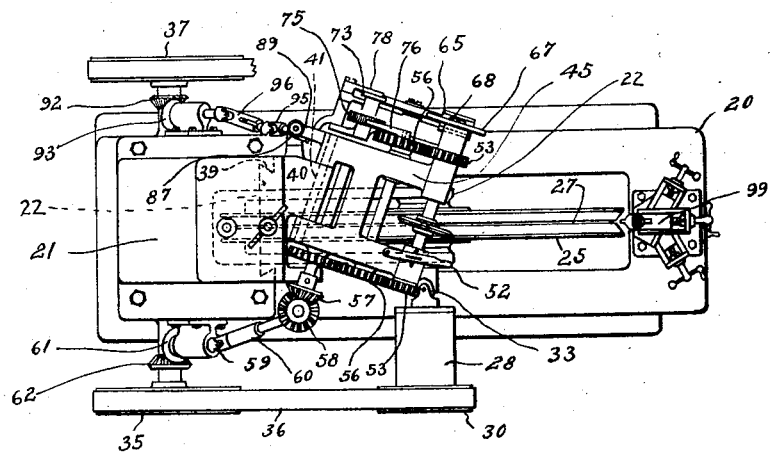
Figure 2 is a top plan view thereof.
Figure 3:
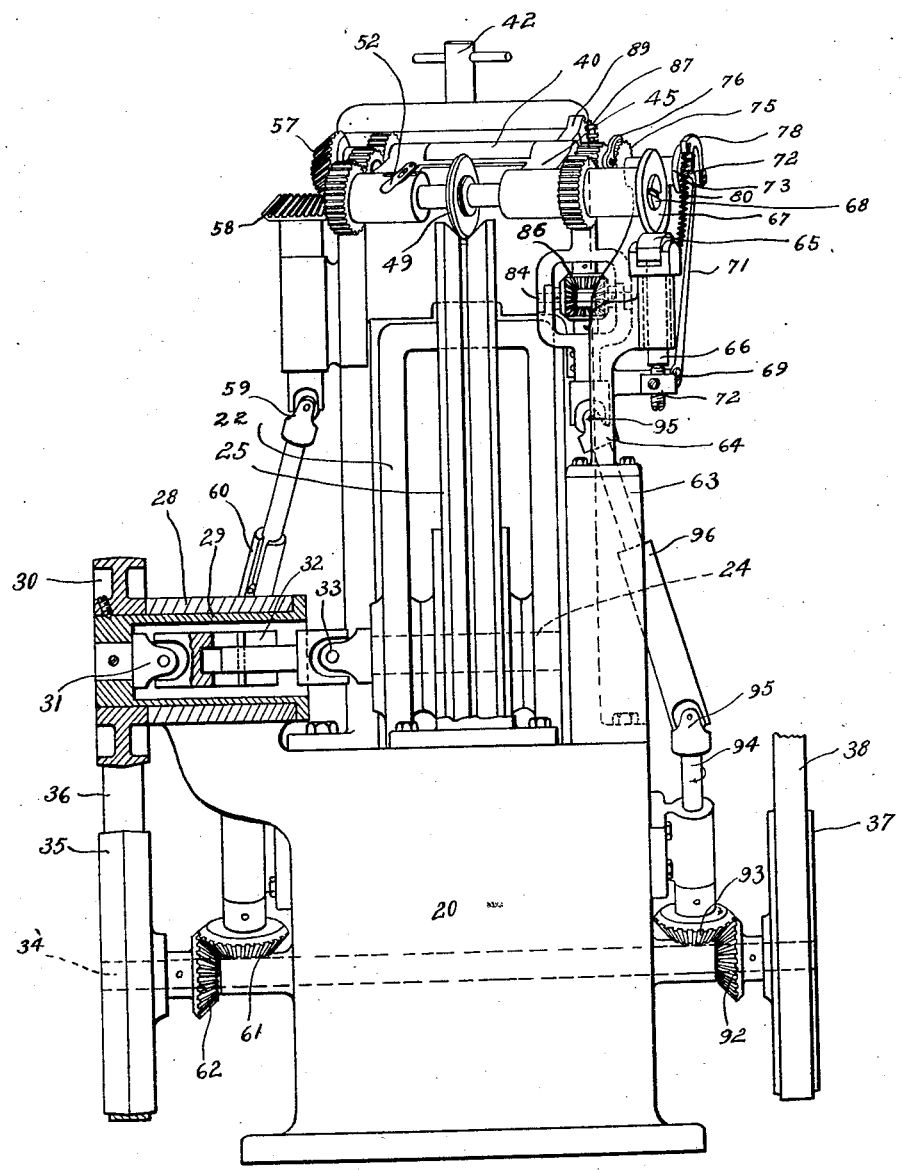
Figure 3 is a front elevation on an enlarged scale, parts being broken away and parts in section.
Figure 4:
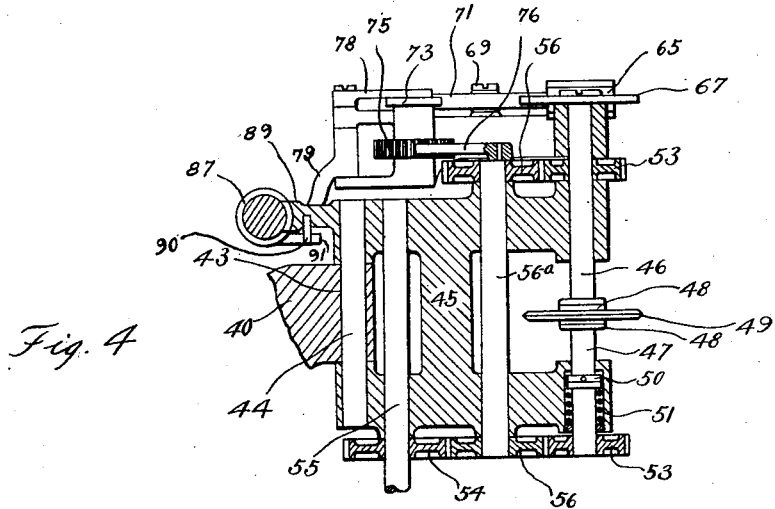
Figure 4 is a horizontal sectional view through the lens holding carriage.

As best shown in Figures 1, 2 and 5, the vertical extension 21 has a dove-tail groove 39, in which slides a member 40 which is adjustable vertically by means of the screw threaded member 41 turned by the handle 42. At its forward extremity the member 40 is provided with a bore 43 through which extends a shaft 44, said shaft acting as a pivot for the yoke or carriage 45.

The carriage 45 is provided at its forward end with two centrally aligned shafts 46 and 47, having at their inner ends the usual lens clamping means 48 for holding the lens 49 securely in place. The shaft 47 has an enlarged portion or collar 50, against which acts the spring 51, in such a way that the lens clamping means 48 may be separated for the insertion and removal of a lens, the shaft 47 being actuated by a lever 52 of any preferred construction. Gears 53 are carried on the outer end of the shafts 46 and 47 and are driven by the gear 54 on shaft 55 through idlers 56. On the outer end of shaft 55 is a bevel gear 57 which meshes with a vertically disposed bevel gear 58; the gear 58 being driven through the universal joint 59, the telescoping propeller shaft 60 and bevel gears 61 and 62. From this it will be evident that by the rotation of the shaft 34, to which is secured the bevel gear 62, power will be transmitted through the mechanism just described to rotate the lens against the abrasive wheel. It will be noted that the axis of the lens is preferably at an angle to the axis of the abrasive wheel, as best shown in Figure 2, and the edge of the lens rides in the V-shaped groove in such a way that both of its sides are bevelled by the surfaces 26. The stone carrying frame 22 is pivotally mounted to make it free to move and thereby compensate for the variations in the contour of the lenses as they are being ground.

On the other side of the machine from the bearing 28 is a support 63, upon which is mounted the bracket 64. Carried in the forward end of the bracket 64 is a contact shoe 65 having a vertical guide pin 66. Upon the extreme end of the shaft 46 is a former 67 which is made of the exact shape of the lens to be ground and is readily detachable by means of the screw 68. This former 67 contacts with the shoe 65 and supports the weight of the free end of the pivoted carriage 45. Pivoted to the bracket 64 by means of the screw 69 is a bell crank having a substantially horizontal forwardly extending arm 70, and an angularly disposed arm 71, the arm 70 being provided with a set screw 72 which may be adjusted to various positions, and upon which rests the guide member 66. The arm 71 has an offset portion 72 at its extremity, which contacts with the surface of a cam 73 in such a way that as the cam is rotated the arm 70 will be raised or lowered, thus regulating the height of the free end of the carriage through the guide post 66 and shoe 65. The shaft 74, to which is secured the cam 73, carries a ratchet 75 which is operated by the pawl 76 eccentrically mounted on the end of the shaft 56ª.

Figure 7:
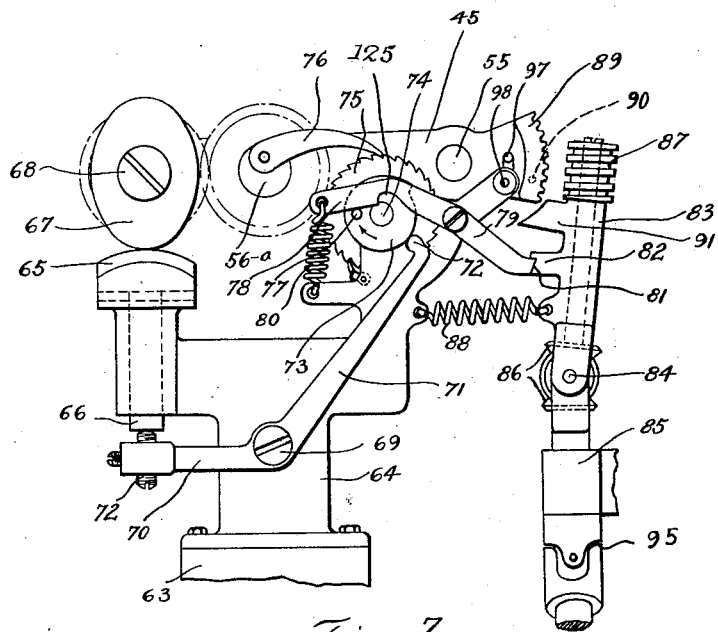
Figure 7 is a fragmentary elevation of the opposite side of the machine from that shown in Figure 1.
Figure 8:
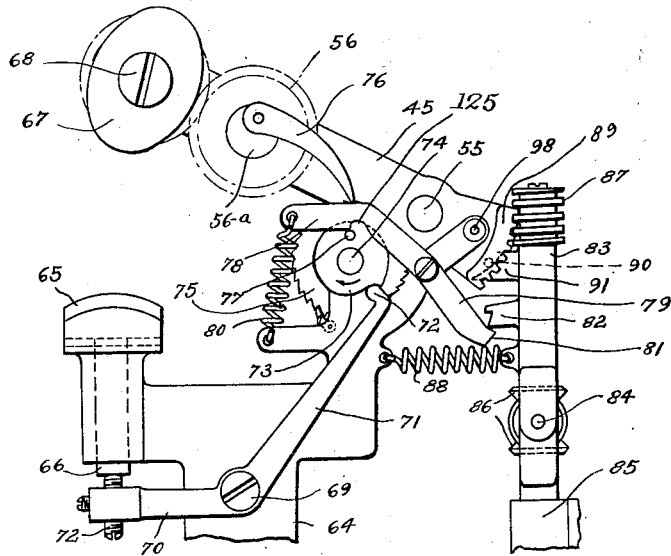
Figure 8 is a similar view illustrating a different position of the parts.

The cam 73 carries an outwardly extending pin 77 upon which rides the offset portion 78 of the pivoted arm 79, it being held against the pin 77 by the action of the spring 80 secured to the bracket 64. At its rearward end the pivoted arm 79 has an angular cam surface 81 which contacts with a comating surface formed on a projection 82 of a differential driving bracket 83. The differential driving bracket is pivoted at 84 to a vertical bracket 85 and is provided with bevel gears 86 which transmit power to a worm 87 at the extreme upper end of the differential. A spring 88 acts to hold the upper portion of the differential in central alignment with the bracket 85 and the cam surface 81 when in the position shown in Figure 7 holds said differential out of alignment. The carriage 45 is provided at its rear end with a segmental worm wheel 89 which may be driven by the worm 87, as best shown in Figure 8. The segmental worm wheel carries an outstanding pin 90 which contacts with the cam surface 91 on the differential casing 83 in such a way that when it has been operated to raise the forward end of the carriage 45 the pin 90 will contact with the cam surface 91 and force the worm 87 out of engagement with the worm wheel 89.

The shaft 34 on the end adjacent the pulley 37 carries a bevel gear 92 which drives a similar gear 93 on shaft 94. The shaft 94 is connected by means of universal joint 95 and telescoping propeller shaft 96 to the differential 86 so as to transmit power to the worm 87.

From the foregoing it will be evident that the free end of the lens holding carriage 45 is supported by the shoe 65 through the former 67, and that the position of the shoe 65 is varied by the rotation of the cam 73 as the grinding progresses. Figure 7 shows the position of these parts while the grinding is being done. As the cam 73 rotates in the direction of the arrow, the pin 77 contacting with the arm 78 will disengage the cam surface 81 from the lug 82 at a predetermined point, whereupon the worm 87 will be forced into engagement with the segmental worm wheel 89 by the action of the spring 88. The rotation of the worm 87 will raise the free end of the carriage 45 into the position shown in Figure 8, whereupon the pin 90 will strike the cam surface 91 on the differential casing 83 and urge the worm 87 out of engagement with the segmental worm wheel 89. To positively disengage the worm 87 and the segmental gear 89 and to hold the worm out of engagement with the segmental gear the pin 77 rides against the lever 78 until it contacts with a depression 125 formed in the arm 78, which allows the spring 80 which has a greater tension than the spring 88 to urge the pivoted arm 79 together with the cam faced end 81 up against the projection 82 of the differential drive bracket 83, thereby forcing the bracket 83 along with the worm 87 away from and clear of the segmental gear 89, thereby disengaging the gears and positioning itself to hold the gears in disengagement. A depression 97 in the outer side of the carriage 45 will be contacted by a spring pressed plunger 98 so as to hold the carriage in a tilted position after the worm has become disengaged. In this tilted position the finished lens may be taken out of the lens clamps and a new blank inserted, after which the carriage 45 may be again lowered by unseating the spring pressed plunger 98.

The abrasive wheel 25 will naturally wear down in use, and it is very necessary, in order to perform good work, that the surfaces 26 be kept straight and true. For this purpose I have provided the hone 99 which may be of any desirable construction, and preferably has one portion which cuts into the kerf 27 at the root of the V-shaped groove. Thus the bottom of the groove is kept entirely free from any irregularities and the accuracy of the work performed on the machine will be certain. As the wheel wears down it will be necessary to lower the work receiving carriage 45, which may be readily done by turning the handle 42 and screw 41, which lowers the slide 40 in the dove-tail groove 49. The hone 99 has a honing face of the same contour as the groove of the grindstone with a small central projection fitting into the kerf 27 of the grindstone as shown in Fig. 2.

Figure 9:
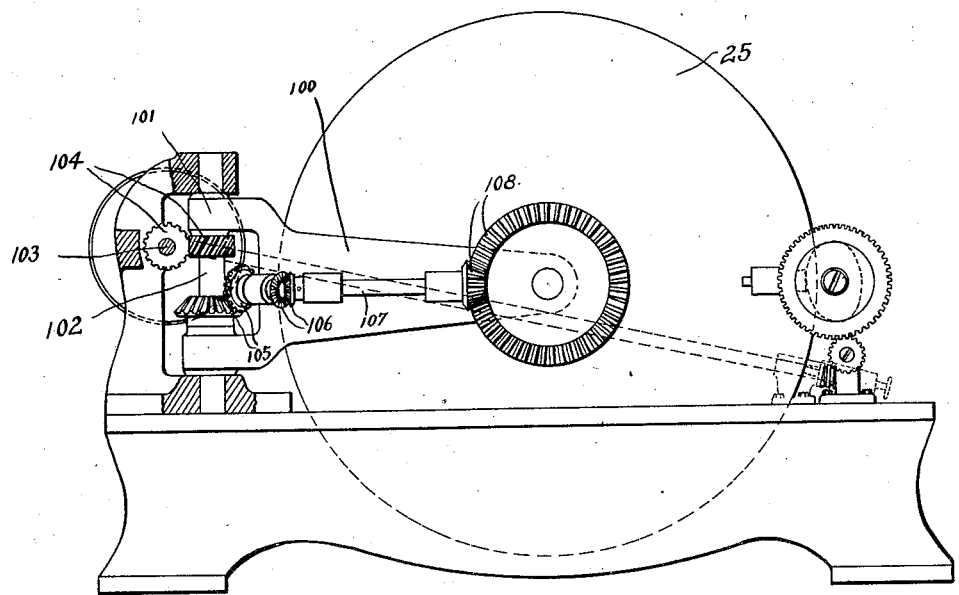
Figure 9 is a side elevation partly in section, illustrating a modified form of construction.
Figure 10:
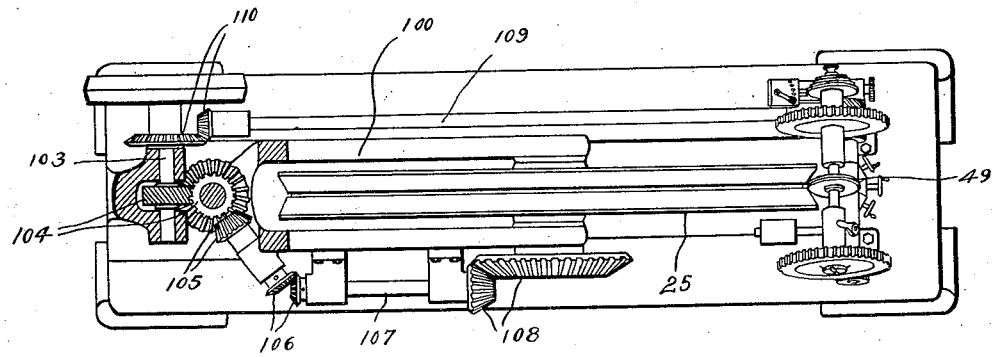
Figure 10 is a top plan view thereof.

Referring now to Figures 9 and 10, I have shown a modification wherein the wheel 25 is rotatably mounted in a frame 100, said frame being pivoted as at 101 to the vertical shaft 102. Power may be applied through the shaft 103, co-mating spiral gears 104, bevel gears 105 and 106, shaft 107 and bevel gears 108. Thus the wheel 25 will be freely rotatable and will float upon the shaft 102 in such a way that relative lateral movement will be possible between the wheel 25 and the lens 49. As shown in these two figures, the lens need not necessarily be mounted at the top of the wheel, but can be mounted at any point on the periphery, and is here shown at the front of the machine. In this case the lens rotating means will be driven by the shaft 109 through bevel gears 110 which receive their power from the shaft 103.

The construction shown in Figures 11 and 12 comprises the usual base 20, on which is horizontally pivoted a yoke 111 having at each end trunnions 112 which are mounted in bearings 113 of the base 20. The abrasive wheel 25 is rotatably mounted in the yoke 111 and provided with any suitable flexible driving means, as at 114. Thus it will be seen that with this construction the grinding wheel 25 is free to rotate on a horizontal axis, while the yoke 111 which carries the wheel 25 is free to rotate on the horizontal axis perpendicular to that of the wheel.

Figure 13:
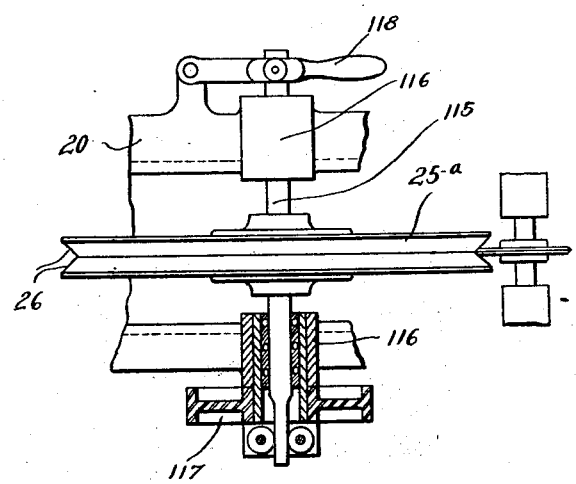
Figures 13 and 14 are a fragmentary top plan view and end elevation, respectively, of another modification.
Figure 14:
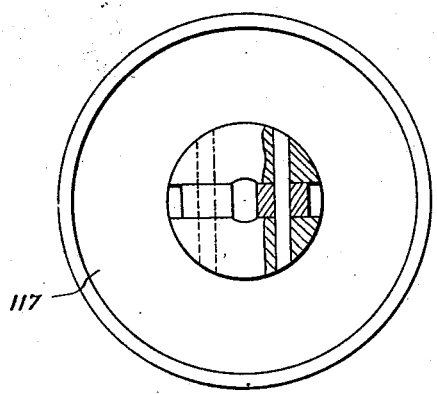

In Figures 13 and 14, I have shown a modification wherein the grinding wheel $25^a$ is secured to a shaft 115, which is mounted in bearings 116 on the base 20. The shaft 115 is mounted so that it may move longitudinally in the bearings 116 and may be provided with a splined driving connection 117 upon one end and a placement lever 118 on its other end. In this form of the invention I have shown the wheel $25^a$ as being provided with the angularly disposed surfaces 26, but without the kerf 27 as shown in the other forms. Also it will be noticed that in this construction the lens has been mounted on an axis parallel with that of the wheel $25^a$.

Figure 15:
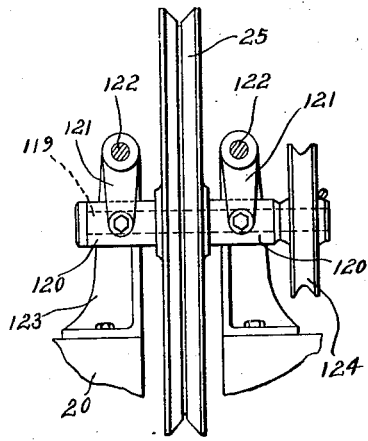
Figures 15 and 16 are a front elevation and end view, respectively, of still another form of the invention.
Figure 16:
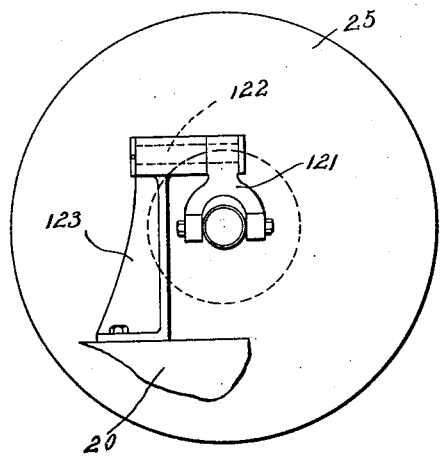

In Figures 15 and 16, I have shown the wheel 25 as mounted upon a shaft 119 which is rotatably mounted in the bearings 120. The bearings 120 are supported at the free ends of yoke arms 121, said yoke arms being pivoted at their upper ends on the shafts 122, which are mounted in brackets 123 on the base 20. The usual or desired flexible driving means 124 is, of course, provided for the rotation of the wheel 25. In this construction, as the wheel 25 is rotated it may move in a line parallel with its axis due to the fact that the bearings 120 are pivoted on the shafts 122.

A machine built in accordance with the present disclosure is especially advantageous in bevelling the edges of toric and meniscus lenses, wherein the plane of the edge of the lens is variable. It is desirable to bevel the edges of lenses in such a way that the center of the bevel will be centrally disposed with relation to the thickness of the material, and for this reason it is necessary to provide the relative lateral movement between the grinding element and the lens. I do not limit myself to the exact construction shown and described, but reserve the right to make such changes as fall within the scope of the appended claims without departing from the spirit of the invention.

Having thus described my invention, what I claim is:

1. In a grinding machine for bevelling the edges of lenses, a base, an abrasive wheel rotatably mounted thereon, said wheel being provided on its periphery with a groove, and being movable laterally by contact of the interior of the groove with the lens alone to compensate for change in contour of the lens, means for holding a lens against the wheel with its edge to be ground in the groove, and means for rotating the lens and the wheel simultaneously.

2. In a grinding machine for bevelling the edges of lenses, a pivoted frame, an abrasive wheel carried thereby, and provided with a V-shaped groove in its periphery, lens clamping means supported adjacent the periphery of the wheel and adapted to hold a lens in the groove of the wheel for grinding, and to move the abrasive wheel laterally to compensate for change in contour of the lens, means for rotating the lens clamps, and a flexible coupling for rotating the wheel in the pivoted frame.

3. A grinding machine comprising a base, a vertically pivoted frame, a rotatable shaft carried by said frame, an abrasive wheel mounted upon said rotatable shaft, a work holding carriage pivoted adjacent the periphery of said abrasive wheel, and adapted to engage the edge of a lens with the periphery of the abrasive wheel, and means for feeding the lens against the abrasive wheel.

4. A grinding machine for bevelling the edges of lenses, comprising a base, a pivoted yoke mounted upon the base, a shaft supported in said yoke, an abrasive wheel mounted upon said shaft and having a peripheral groove, flexible means for rotating the shaft and the wheel, a work holder mounted adjacent the periphery of the wheel and adapted to hold a lens with its edge in the groove of the wheel, and means for gradually feeding the lens against the abrasive wheel.

5. A grinding machine for bevelling the edges of lenses, comprising a base, a vertical extension at the rearward side thereof, a yoke vertically pivoted in said base and extension, a shaft rotatable in said yoke, an abrasive wheel mounted upon said shaft, said wheel having an angular groove in its periphery, a work holding carriage pivoted adjacent the periphery of said abrasive wheel, centrally aligned shafts in the free end of said carriage and adapted to hold a lens therebetween, a former mounted upon one of the centrally aligned shafts to control the shape to which the lens will be ground, means for feeding the lens against the wheel, and means for limiting the amount of grinding performed on the lens.

6. In combination, a base, a yoke vertically pivoted thereon, an abrasive wheel rotatably mounted in said yoke, a carriage pivoted adjacent the periphery of said wheel, lens holders mounted in the free end of said carriage, a former in central alignment with said lens holders and rotatable therewith, a contact shoe supporting said former, means for gradually moving the contact shoe to feed the lens against the wheel, and means for disengaging the lens from the wheel when the desired amount of material has been ground away.

7. In a machine of the character described, a frame, an abrasive wheel rotatable thereon, a work supporting carriage pivoted to the frame and adapted to present a piece of work to the periphery of the abrasive wheel, a gear segment mounted on the carriage, a worm adapted to engage the segment to operate same so as to move the work out of engagement with the abrasive wheel, and means for alternately connecting and disconnecting the worm and gear segment automatically.

8. In a machine of the character described, a frame, an abrasive wheel rotatable thereon, a swinging carriage pivoted to the frame, lens clamping means in the free end of the carriage adapted to hold a lens against the abrasive wheel, a gear segment carried by the other end of the carriage, a worm adjustably mounted on the frame for engaging the gear segment, means for rotating the worm, and automatic means for throwing the worm into engagement with the gear segment when the grinding is complete, thereby swinging the free end of the carriage away from the stone.

9. In a machine of the character described, a frame, an abrasive wheel rotatably mounted thereon, a swinging carriage pivoted to the frame, lens clamps in the free end of the carriage, a gear segment carried by the other end of the carriage, a worm adjustably mounted on the frame and adapted to engage the gear segment, means for normally holding the worm out of engagement with the gear segment, a trip mechanism for releasing said holding means whereby the worm and gear segment will be engaged to raise the free end of the carriage, and additional means for subsequently disengaging the worm from the segment after the carriage is raised.

WILLIAM L. SCHULTZ.